3,240,759
HIGH SHRINKAGE SYNTHETIC LINEAR POLYCARBONAMIDES

Lawrence W. Crovatt, Jr., Cary, William A. H. Huffman, Durham, and James S. Tapp, Raleigh, N.C., assignors to Monsanto Company, St. Louis, Mo., a corporation of Delaware
No Drawing. Filed May 14, 1962, Ser. No. 194,731
9 Claims. (Cl. 260—78)

This invention relates to modified synthetic linear polycarbonamides. More particularly, this invention relates to modified synthetic linear polycarbonamides having high shrinkage properties and to a process for producing the same.

The polymeric substances with which this invention is concerned are synthetic high molecular weight polycarbonamides of the general type characterized by the presence of recurring carbonamide groups as an integral part of the polymer chain, and wherein such groups are separated by at least two carbon atoms. They are further characterized by high melting point, pronounced crystallinity and insolubility in most solvents except mineral acids, formic acid, and the phenols. Upon hydrolysis with strong mineral acids, the polymers revert to the reactants from which they were formed.

The simple polyamides of this type are usually made by heating substantially equal molecular proportions of a diamine with a saturated dicarboxylic acid until the product has polymerized to the fiber-forming stage, which stage is not generally reached until the polyamide has an inherent viscosity of at least 0.4. The inherent viscosity is defined as $$\frac{\ln \eta_r}{C}$$

in which $\eta_r$ is the viscosity of a very dilute solution (e.g., 0.5 percent) of the polymer divided by the viscosity of m-cresol at the same temperature (e.g., 25° C.) in the same units, and C is the concentration of polymer in grams per 100 cc. of solution. The polymers thus obtained have high melting points and can be cold drawn to form strong polyoriented fibers.

The diamines and saturated dicarboxylic acids or amide-forming derivatives thereof which can be used as reactants to yield the simple fiber-forming polyamides are well known to the art. Suitable diamines may be represented by the general formula

$$NH_2(CH_2)_nNH_2$$

in which $n$ is an integer of 2 or greater and preferably from 2 to 10. Illustrative of suitable diamines which may be employed are ethylene diamine, propylene diamine, tetramethylene diamine, pentamethylene diamine, hexamethylene diamine, octamethylene diamine, decamethylene diamine, and the like. The saturated dicarboxylic acid reactants are represented by the general formula

HOOCRCOOH in which R is a divalent hydrocarbon radical having a chain length of at least 2 carbon atoms. Illustrative of suitable saturated dicarboxylic acids which may be employed are sebacic acid, octadecanedioic acid, adipic acid, suberic acid, azelaic acid, undecanedioic acid, pimelic acid, brassylic acid, tetradecanedioic acid, and the like. The amide-forming derivatives of diamines which may be employed include the carbamate and N-formyl derivative. Suitable amide-forming derivatives of the dibasic carboxylic acids comprises the mono- and di-ester, the anhydride, the mono- and diamide and the acid halide.

In the course of the development of the synthetic textile fiber industry, much effort has been expended towards the production of fibers which retain the well known advantages of synthetic fibers such as ease of care, improved mechanical properties, durability, and the like, but which, at the same time, possess the properties required to obtain fabrics of outstanding aesthetic appeal. Such fabrics should have good bulk and cover, obtainable at relatively low finishing shrinkage which is quite desirable from an economic standpoint. In addition, these fabrics should have excellent elastic properties such as stretchability, compressional resilience, and liveliness, and display a pleasing surface handle. The surface of these fabrics should be renewable, even after such severe deformations as crushing or glazing, a new surface can easily be obtained, for example, by wetting, steaming, or mere recovery in humid air. These fibers are usually prepared by spinning together two or more materials having different shrinkage characteristics to form a composite filament. Therefore, the need for polyamide materials having high shrinkage characteristics is great in the preparation of the fibers discussed above. In addition, high shrinkage fibers are of great value in the preparation of shrink fit garments such as hosiery and the like. High shrinkage polyamide fibers would also be of value in tight construction applications. Consequently, polyamide materials having high shrinkage characteristics are desirable and may be used in many applications.

It is an object of this invention to prepare synthetic linear polyamides having increased shrinkage characteristics.

Another object of this invention is to prepare synthetic linear polyamides having increased shrinkage characteristics which may be prepared using conventional polyamide spinning conditions.

Other objects and advantages of this invention will become apparent from the following detailed description of the invention.

In accordance with the present invention a synthetic linear polycarbonamide is prepared by reacting a polyamide-forming composition consisting of substantially equimolecular proportions of a saturated dicarboxylic acid and a diamine in the presence of from about 0.5 mole percent to 50.0 mole percent based on said saturated dicarboxylic acid of a mono-unsaturated dicarboxylic acid containing from 6 to 10 carbon atoms. It is preferred to use 5.0 mole percent to 30.0 mole percent of the mono-unsaturated dicarboxylic acid. In addition, the diamine salts of these mono-unsaturated dicarboxylic acids are applicable for the purposes of this invention.

The modified synthetic linear polyamides of this invention may be prepared, spun, and drawn under conventional polyamide fiber production conditions. Boiling water shrinkage of these modified synthetic linear polyamide fibers were as much as 190% greater than conventional polyamide fibers. In addition, high shrinkage polyamide fibers possess excellent whiteness values and physical properties.

The mono-unsaturated dicarboxylic acids used in preparing the compositions of this invention may be either straight chain or branch chain compounds. In addition, both the cis and trans isomer forms of the mono-unsaturated dicarboxylic acids may be used.

Illustrative of straight chain mono-unsaturated dicarboxylic acids which are suitable for the purposes of the invention are 2-hexenedioic acid, 3-hexenedioic acid, 2-hepteneioic acid, 3-heptenedioic acid, 2-octenedioic acid, 3-octenedioic acid, 4-octenedioic acid, 2-nonenedioic acid, 3-nonenedioic acid, 4-nonenedioic acid, 2-decenedioic acid, 3-decenedioic acid, 4-decenedioic acid, and 5-decenedioic acid.

Illustrative of branch chain mono-unsaturated dicarboxylic acids which are suitable for the purposes of this invention are 2-methyl-2-hexenedioic acid, 3-ethyl-2-hexenedioic acid, 2-methyl-3-propyl-3-hexenedioic acid, 2-butyl-3-hexenedioic acid, 2-ethyl-2-heptenedioic acid, 3-propyl-2-heptenedioic acid, 2-ethyl-3-methyl-3-heptenedioic acid, 2-methyl-2-octenedioic acid, 2-methyl-3-methyl-2-octenedioic acid, 2-ethyl-3-octenedioic acid, 3-methyl-3-octenedioic acid, 3-ethyl-4-octenedioic acid, 2-methyl-4-octenedioic acid, 3-methyl-4-methyl-4-octenedioic acid, 2-methyl-2-nonenedioic acid, 3-methyl-2-noneenedioic acid, 2-methyl-3-nonenedioic acid, 4-methyl-3-nonenedioic acid, 3-methyl-4-nonenedioic acid, 4-methyl-4-nonenedioic acid, and the like.

As has been indicated, the diamine salts of the aforenoted mono-unsaturated dicarboxylic acids are also applicable. These salts may be obtained in the usual manner by reacting equivalent weights of the mono-unsaturated dicarboxylic acid of choice with an appropriate diamine. The diamines that may be employed in forming the afore-noted salts are any of those which have been noted as applicable in producing the fiber-forming polyamides. That is, those diamines which may be represented by the general formula $$NH_2(CH_2)_nNH_2$$

in which $n$ is an integer of 2 or greater and preferably from 2 to 10. Among specific examples which may be employed are pentamethylene diamine, hexamethylene diamine, octamethylene diamine, decamethylene diamine, and the like. The diamine used to form the mono-unsaturated dicarboxylic acid salt may be the same as or different from that employed in the forming of the polyamide salt. That is, the same or different diamines may be present in forming the polymers of this invention.

The modified synthetic linear polyamides as described herein are prepared by procedures well known in the art and commonly employed in the manufacture of simple polyamides. The reactants are heated at a temperature of from 180° C. to 300° C. and preferably from 200° C. 295° C. until the product has a suffiicently high molecular weight to exhibit fiber-forming properties. This condition is reached when the polyamide has an inherent viscosity of at least 0.4 in accordance with the definition of inherent viscosity as given hereinabove. The reaction can be conducted at superatmospheric, atmospheric, or sub-atmospheric pressure. Often it is desirable, especially in the last stage of the reaction, to employ conditions, e.g., reduced pressure, which will aid in the removal of the reaction byproducts. The afore-described monounsaturated dicarboxylic acid compounds or their amine salts may be added to the polymerization autoclave with the polyamide-forming reactants or separately either before or after the polymerization reaction has begun. The conventional polyamide-forming reactants are normally introduced as a pre-formed salt but may be in the form of uncombined diamine and dicarboxylic acid when added to the autoclave.

In the preparation of the polyamides of this invention, other modifying agents may be added, for example, delusterants, anti-oxidants, plasticizers, and the like.

The modified polyamides of this invention are of primary interest for use in the manufacture of yarns and fabrics. They are, however, equally useful in other end products such as films, coatings, bristles, and the like.

In order to illustrate the invention and the advantages thereof with greater particularity, the following specific examples are given. It should be understood that they are intended to be only illustrative and not limitative. Parts are given by weight unless otherwise indicated.

*Example I*

This example illustrates the preparation of a conventional polyamide. This polymer and the fiber therefrom are to be used as a standard of comparison with the modified polyamides of the present invention.

0.748 mole of hexamethylene diammonium adipate salt dissolved in 11.3 moles of water were added to a small stainless steel evaporator. The evaporator was purged with Seaford grade nitrogen and then brought to a pressure of 13 p.s.i.g. The reaction mixture was heated to a temperature of 137° C. with the continuous removal of steam. At this temperature the concentrated solution was piped into a stainless steel high pressure autoclave. In this reactor the system was brought to 250 p.s.i.g. pressure at a temperature of 220° C. Steam was removed until the polymer melt temperature reached 243° C. At this point the reactor pressure was gradually reduced to atmospheric pressure and the polymer melt was allowed to equilibrate for 30 minutes at 278° C. The relative viscosity of the polymer was 31.13 as determined for a solution of 8.4% of the polymer in 90% formic acid.

The polymer was melt spun at 280° C. into white multi-filament yarn. This fiber was machine drawn at a ratio of 5.60 times its original length over pins at a temperature of 90° C. The resultant drawn fiber (830 denier/140 multifilament) was found to have a melting point of 250° C. and an ultimate tenacity of 8.9 g. per denier at 19.5% elongation. Percent breaking strength retention of this drawn fiber after exposure to 100 standard fadometer hours was determined to be 40.7%. After exposure to 200° C. for 8 hours the fibers were determined to have 26.8% retention of the original breaking strength. Acid dye saturation of the fibers using Ciba Scarlet 4RA dye was determined to be 1.64% of the total weight of fiber.

Boiling water shrinkage of these drawn fibers was determined to be 11.7%.

*Example II*

0.711 mole of hexamethylene diamonnium adipate salt dissolved in 10.8 moles of water was added to a small stainless steel evaporator. The evaporator was purged with Seaford grade nitrogen and then brought to a pressure of 13 p.s.i.g. After the temperature was raised to 137° C. with the continuous removal of steam the concentrated solution was piped into a stainless steel high pressure autoclave which contained 0.0374 mole (5.0 mole percent) of 1:1 molar hexamethylenediamine salt of 3-hexenedioic acid. In this reactor the system was brought to 250 p.s.i.g. pressure at a temperature of 220° C. Steam was removed until the polymer melt temperature reached 243° C. At this point the reactor pressure was gradually reduced to atmospheric pressure and the polymer melt was allowed to equilibrate for 30 minutes at 278° C. The relative viscosity of the polymer was 29.23 as determined for a solution of 8.4% of the polymer in 90% formic acid.

The copolymer was melt spun at 280° C. into white multi-filament yarn. This fiber was machine drawn at a ratio of 5.25 times its original length over pins at a temperature of 90° C. The resultant drawn fiber (950 denier/140 multifilament) was determined to have a melting point of 240° C. and an ultimate tenacity of 6.5 grams/denier at 22.0% elongation. Percent breaking strength retention of this drawn fiber after exposure to 100 standard fadometer hours was determined to be 33.3% After exposure to 200° C. for 8 hours the fiber was determined to have 23.8% retention of the original breaking strength. Acid dye saturation of the fibers using Ciba Scarlet 4RA dye was determined to be 1.54% of the total weight of the fiber.

Boiling water shrinkage of these drawn fibers was determined to be 15.3% which represents a 30.8% increase in shrinkage over the control or unmodified polyamide fiber prepared in Example I.

*Example III*

This example was identical to Example II in preparation, however, the concentration of hexamethylene diammonium adipate was reduced to 0.6723 mole (90.0 mole percent) and the concentration of 1:1 molar hexamethylene diamine salt of 3-hexenedioic acid was increased to 0.0748 mole (10.0 mole percent). The relative viscosity of the polymer was 30.34 as determined for a solution of 8.4% of the polymer in 90% formic acid.

The copolymer was melt spun at 280–285° C. into white multi-filament yarn. This fiber was machine drawn at a ratio of 5.45 times its original length over pins at a temperature of 90° C. The resultant drawn fiber (776 denier/140 multifilament) was determined to have a melting point of 238° C. and tenacity of 7.2 g. per denier at 20% elongation. Percent breaking strength retention of this drawn fiber after 100 standard fadometer hours of exposure was 36.8%. After exposure to 200° C. for 8 hours the yarn was determined to have 29.7% retention of the original breaking strength. The acid dye saturation of the spun fibers using Ciba Scarlet 4RA dye was determined to be 1.52% of the total weight of the fiber.

The boiling water shrinkage of these drawn fibers was determined to be 19.0% which represents a 62.5% increase in shrinkage over the control or unmodified fiber prepared in Example I.

*Example IV*

This example was identical to Example II in preparation, however, the concentration of hexamethylene diammonium adipate was reduced to 0.6084 mole (80.0 mole percent) and the concentration of 1:1 molar hexamethylenediamine salt of 3-hexenedioic acid was increased to 0.1498 mole (20.0 mole percent). The relative viscosity of the polymer was 29.28 as determined for a solution of 8.4% of the polymer in 90% formic acid.

The copolymer was melt spun at 280–285° C. into white multi-filament yarn. This fiber was machine drawn at a ratio of 5.70 times its original length over pins at a temperature of 90° C. The resultant drawn fiber (550 denier/140 multifilament) was determined to have a melting point of 228° C. and an ultimate tenacity of 7.0 g. per denier at 20.6% elongation. Percent breaking strength retention of this drawn fiber after 100 standard fadometer hours of exposure was 37.8%. After exposure to 200° C. for 8 hours the fiber was determined to have 15.4% retention of the original breaking strength. The acid dye saturation of the fiber using Ciba Scarlet 4RA was determined to be 1.50% of the total weight of the fiber.

The boiling water shrinkage of these drawn yarn fibers was determined to be 34.0% which represents 190% increase in shrinkage over the controlled or unmodified fiber.

As many widely different embodiments of this invention may be made without departing from the spirit and scope thereof, it is to be understood that the invention is not to be limited by the specific embodiments set forth herein but only by the claims which follow.

We claim:
1. A fiber-forming synthetic linear polycarbonamide having a boiling water shrinkage of at least 15 percent when in fiber form and having recurring amide groups as an integral part of the main polymer chain, and wherein said groups are separated by at least 2 carbon atoms, consisting essentially of the product obtained from reactants consisting essentially of (A) a polyamide-forming composition consisting of substantially equimolecular weights of an aliphatic saturated dicarboxylic acid of the formula HOOCRCOOH wherein R is a divalent hydrocarbon radical having a chain length of at least 2 carbon atoms and an aliphatic diamine of the formula $NH_2[CH_2]_nNH_2$ wherein $n$ is an integer of at least 2, and (B) from about 0.50 to 50.0 mole percent based on said saturated dicarboxylic acid of a compound selected from the group consisting of aliphatic mono-unsaturated dicarboxylic acids having from 6 to 10 carbon atoms and diamine salts of said mono-unsaturated dicarboxylic acids and diamines of the formula $NH_2[CH_2]_nNH_2$ wherein $n$ is an integer of at least 2.

2. The synthetic linear polycarbonamide as defined in claim 1, wherein said polyamide-forming composition consists of substantially equimolecular weights of adipic acid and hexamethylene diamine.

3. The synthetic linear polycarbonamide as defined in claim 1, wherein said mono-unsaturated dicarboxylic acid is 3-hexenedioic acid.

4. The synthetic linear polycarbonamide as set forth in claim 1, wherein said diamine salt of said mono-unsaturated dicarboxylic acid is the hexamethylene diamine salt of 3-hexenedioic acid.

5. A fiber-forming synthetic linear polycarbonamide having a boiling water shrinkage of at least 15 percent when in fiber form and having recurring amide groups as an integral part of the main polymer chain, and wherein said groups are separated by at least 2 carbon atoms, consisting essentially of the product obtained from reactants consisting essentially of (A) a polyamide-forming composition consisting of substantially equimolecular weights of an aliphatic saturated dicarboxylic acid of the formula HOOCRCOOH wherein R is a divalent hydrocarbon radical having a chain length of at least 2 carbon atoms and an aliphatic diamine of the formula $NH_2[CH_2]_nNH_2$ wherein $n$ is an integer of at least 2, and (B) from about 5.0 to 30.0 mole percent based on said saturated dicarboxylic acid of a compound selected from the group consisting of aliphatic mono-unsaturated dicarboxylic acids having a carbon content of from 6 to 10 and diamine salts of said mono-unsaturated dicarboxylic acids and diamines of the formula $NH_2[CH_2]_nNH_2$ wherein $n$ is an integer of at least 2.

6. The fiber-forming synthetic linear polycarbonamide as defined in claim 5 wherein said polyamide-forming composition consists of substantially equimolecular weights of adipic acid and hexamethylene diamine.

7. The fiber-forming synthetic linear polycarbonamide as defined in claim 5, wherein said mono-unsaturated dicarboxylic acid is 3-hexenedioic acid.

8. The fiber-forming synthetic linear polycarbonamide as defined in claim 5, wherein said diamine salt of said mono-unsaturated dicarboxylic acid is the hexamethylene diamine salt of 3-hexenedioic acid.

9. A textile fiber comprising the polycarbonamide as defined in claim 5.

References Cited by the Examiner

UNITED STATES PATENTS

| | | | |
|---|---|---|---|
| 2,149,286 | 3/1939 | Graves | 260—78 |
| 2,174,619 | 10/1939 | Carothers | 260—78 |
| 2,243,662 | 5/1941 | Vaala | 260—78 |
| 3,081,281 | 3/1963 | Beghin | 260—78 |

WILLIAM H. SHORT, *Primary Examiner.*

JOSEPH R. LIBERMAN, *Examiner.*